US012054228B2

(12) United States Patent
Bonnaffoux et al.

(10) Patent No.: US 12,054,228 B2
(45) Date of Patent: Aug. 6, 2024

(54) FLOATING WIND TURBINE SUPPORT

(71) Applicant: SINGLE BUOY MOORINGS INC., Marly (CH)

(72) Inventors: Guillaume Bonnaffoux, Bât. Aigue Marine (MC); Morgan Ducarin, Bât. Aigue Marine (MC); Benjamin Bodot, Bât. Aigue Marine (MC); Alexis Moinard, Bât. Aigue Marine (MC); Nicolas Fourdilis, Bât. Aigue Marine (MC); Christian Raymond Bauduin, Bât. Aigue Marine (MC); Cécile Melis, Bât. Aigue Marine (MC); Antoine Le Cotty, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 396 days.

(21) Appl. No.: 17/416,960

(22) PCT Filed: Dec. 19, 2019

(86) PCT No.: PCT/EP2019/086418
§ 371 (c)(1),
(2) Date: Jun. 21, 2021

(87) PCT Pub. No.: WO2020/127804
PCT Pub. Date: Jun. 25, 2020

(65) Prior Publication Data
US 2022/0081072 A1    Mar. 17, 2022

(30) Foreign Application Priority Data

Dec. 19, 2018  (EP) ..................................... 18214142

(51) Int. Cl.
*B63B 21/50*    (2006.01)
*B63B 21/20*    (2006.01)
(Continued)

(52) U.S. Cl.
CPC ............ *B63B 21/502* (2013.01); *B63B 21/20* (2013.01); *B63B 35/44* (2013.01); *F03D 13/25* (2016.05);
(Continued)

(58) Field of Classification Search
CPC ....... B63B 21/502; B63B 21/20; B63B 35/44; B63B 2035/44; B63B 2001/126;
(Continued)

(56) References Cited

U.S. PATENT DOCUMENTS 7,044,072 B2    5/2006  Converse et al.
9,523,355 B2 *  12/2016  Taub ...................... E02D 27/52
(Continued)

FOREIGN PATENT DOCUMENTS

EP    1 583 907    10/2005
EP    2 708 742    3/2014
(Continued)

OTHER PUBLICATIONS

International Search Report for PCT/EP2019/086418 dated Feb. 19, 2020, 4 pages.
(Continued)

*Primary Examiner* — Daniel V Venne
(74) *Attorney, Agent, or Firm* — NIXON & VANDERHYE

(57) ABSTRACT

Floating support for a wind turbine including a central support member, and at least three buoyancy assemblies, each connected to the central support member via a radial connector beam and mutually interconnected via a transverse connector beam, wherein each buoyancy assembly includes a connector body having two radial sides, an outward and an inward transverse side, wherein two transverse connector beams and a radial connector beam extend away from the inward transverse side of the connector body,
(Continued)

an anchor is provided at or near the outward transverse side of the connector body and the radial sides of the connector body are each connected to a respective buoyancy element.

14 Claims, 3 Drawing Sheets

(51) Int. Cl.
*B63B 35/44* (2006.01)
*F03D 13/25* (2016.01)

(52) U.S. Cl.
CPC ..... *B63B 2035/446* (2013.01); *F05B 2240/93* (2013.01)

(58) Field of Classification Search
CPC ............... B63B 2001/128; F03D 13/25; F05B 2240/93; F05B 2240/95; Y02E 10/72; Y02E 10/727
USPC ................................. 114/264, 265, 266, 267
See application file for complete search history.

(56) References Cited

U.S. PATENT DOCUMENTS

| | | | |
|---|---|---|---|
| 9,739,267 | B2 * | 8/2017 | Averbuch ................ F03D 13/10 |
| 2012/0187693 | A1 | 7/2012 | Houvener et al. |
| 2014/0079548 | A1 | 3/2014 | Rodríguez Tsouroukdissian |
| 2018/0170490 | A1 | 6/2018 | Melis et al. |
| 2019/0078556 | A1 | 3/2019 | Stiesdal |

FOREIGN PATENT DOCUMENTS

| | | |
|---|---|---|
| WO | 2004/061302 | 7/2004 |
| WO | 2012/051382 | 4/2012 |
| WO | 2016/207427 | 12/2016 |
| WO | 2017/157399 | 9/2017 |

OTHER PUBLICATIONS

Written Opinion of the ISA for PCT/EP2019/086418 dated Feb. 19, 2020, 8 pages.

* cited by examiner

FLOATING WIND TURBINE SUPPORT

This application is the U.S. national phase of International Application No. PCT/EP2019/086418 filed Dec. 19, 2019 which designated the U.S. and claims priority to EP Patent Application No. 18214142.4 filed Dec. 19, 2018, the entire contents of each of which are hereby incorporated by reference.

FIELD OF THE INVENTION

The invention relates to a floating support for a wind turbine comprising a central support member, and at least three buoyancy assemblies connected to the central support member via a radial connector beam, and mutually interconnected via a lateral connector beam.

The invention also relates to a buoyancy assembly for use in a floating support and to a method of manufacturing such a buoyancy assembly.

BACKGROUND OF THE INVENTION

A floating foundation of the above mentioned type is known from EP 1 583 907, in which three submerged cylindrical buoyancy members are described that are attached to a central column via respective leg sections extending above sea level. The central column carries the nacelle and rotors of the wind turbine. The cylindrical buoyancy members are attached to the sea bed via catenary anchor chains, tension legs or tethers.

The size of floating foundations for wind turbines may be thirty meters in height at a width of 70 m or more. The volume of the buoyancy members is about 250 m3, which is provided by cylindrical bodies of about 10 m in height at a diameter of about 6 m.

WO2017/157399 describes a floating wind turbine foundation in the form of a spar buoy, in which the lateral and radial braces are interconnected in a lateral node. Each node carries a set of hull buoyancy tanks and is connected to the mooring lines.

In Villaespesa, Gonzalez and Martin, Transportation and Installation of the TetraSpar Floating Offshore Wind turbine, Jun. 15, 2018, towing of a tetrahedral wind turbine foundation is described in a test configuration using a scale model, with a deballasted counterweight, in the direction of one the radial beams by means of towing lines that are attached to the nodes and to the central vertical column.

An object of the present invention is to provide a stable floating foundation for wind turbines that can be constructed in an economic manner. It is a further object of the invention to provide a floating foundation for wind turbines that can be transported to its deployment site in an effective and reliable manner. It is a further object of the invention to provide a floating foundation for wind turbines that can be securely anchored to the sea bed.

SUMMARY OF THE INVENTION

Hereto the floating support according to the invention is characterized in that each buoyancy assembly comprises a connector body having two radial sides, an outward and an inward transverse side, wherein two transverse connector beams and a radial connector beam extend away from the inward transverse side of the connector body, anchoring means are provided at or near the outward transverse side of the connector body and the radial sides of the connector body each being connected to a respective buoyancy element.

By placing the buoyancy elements at spaced-apart positions on the radial sides of the connector body, the radial beam, lateral beams and anchor lines can be solidly interconnected via the connector body without a direct interaction with the buoyancy elements. This results in a strong interconnection while the buoyancy elements are not exposed to large structural loads or anchoring forces and can hence be formed of a relatively light weight-buoyant construction.

When anchoring the floating support to the sea bed, the spaced apart buoyancy elements allow unobstructed access of the anchor lines to pass between the adjacent buoyancy elements to the anchoring means on the connector body, such as for instance chain lockers. The anchoring loads are transferred completely to the connector body without having to pass through the buoyancy members.

Furthermore, the spaced-apart buoyancy members allow connection of the top of the anchor lines via a tensioning cable extending from the anchoring means on the connector body, upwards to a tensioning device that is placed on the central column for applying the required tension on the anchor lines without having to pass over the buoyancy elements. Hereby the buoyancy members are not subjected to forces during anchor line tensioning and the path between the tensioning device on the central column and the connector body can be a substantially straight line path, by which anchor line tensioning is facilitated.

In an embodiment, the connector bodies carry at or near their outward transverse sides at least one, preferably at least two pivoting chain connectors. Via the pivoting chain connectors, the mooring forces are transferred directly to the connector body and from there on to the radial and to the lateral connector beams.

The central support member may carry a chain tensioning device, a chain tensioning path extending along a substantially straight line path from the chain connector, between the buoyancy elements to the tensioning device.

The central support member may comprise a vertical section, a radial interconnecting beam extending from a predetermined height along the vertical section above the connector body, to a top face of each connector body. In this way a tetrahedron shape frame is formed with the connector bodies situated at the corners of the base plane.

In a further embodiment of a floating support according to the invention, the second end parts of the connector bodies project a distance from a plane touching the circumference of the two buoyancy elements. In this construction, the mooring lines or towing lines connected to the connector bodies can extend at larger sideways angels relative to a plane of symmetry, without interfering with the buoyancy elements.

The buoyancy elements are preferably of cylindrical shape comprising a stack of reinforced cylindrical segments interconnected by circumferential welding. The connector bodies allow the use of simple reinforcement of the buoyancy members hence reducing the costs of manufacture.

A method of producing a buoyancy assembly according to the present invention comprises the steps of:
  forming two cylindrical buoyancy elements by stacking of reinforced annular segments,
  interconnecting abutting annular segments by circumferential welding,
  providing a connector body, and connecting the two buoyancy elements to respective radial sides of the connector body.

By constructing the buoyancy elements of annular segments with a simple reinforcement structure, that can be interconnected using automated circumferential welding process, simplified logistics and reduced costs are achieved.

Reinforcement brackets may be connected to the inside of the annular side plates and the reinforcement panels, prior to welding the segments together.

Depending on the strength required of the buoyancy elements, two or more reinforcement panels may be fitted within any one annular side plate.

BRIEF DESCRIPTION OF THE DRAWINGS

Some embodiments of a floating support according to the invention, will by way of non-limiting example, be described in detail with reference to the accompanying drawing. In the drawings.

DETAILED DESCRIPTION OF THE INVENTION

Figure 1:
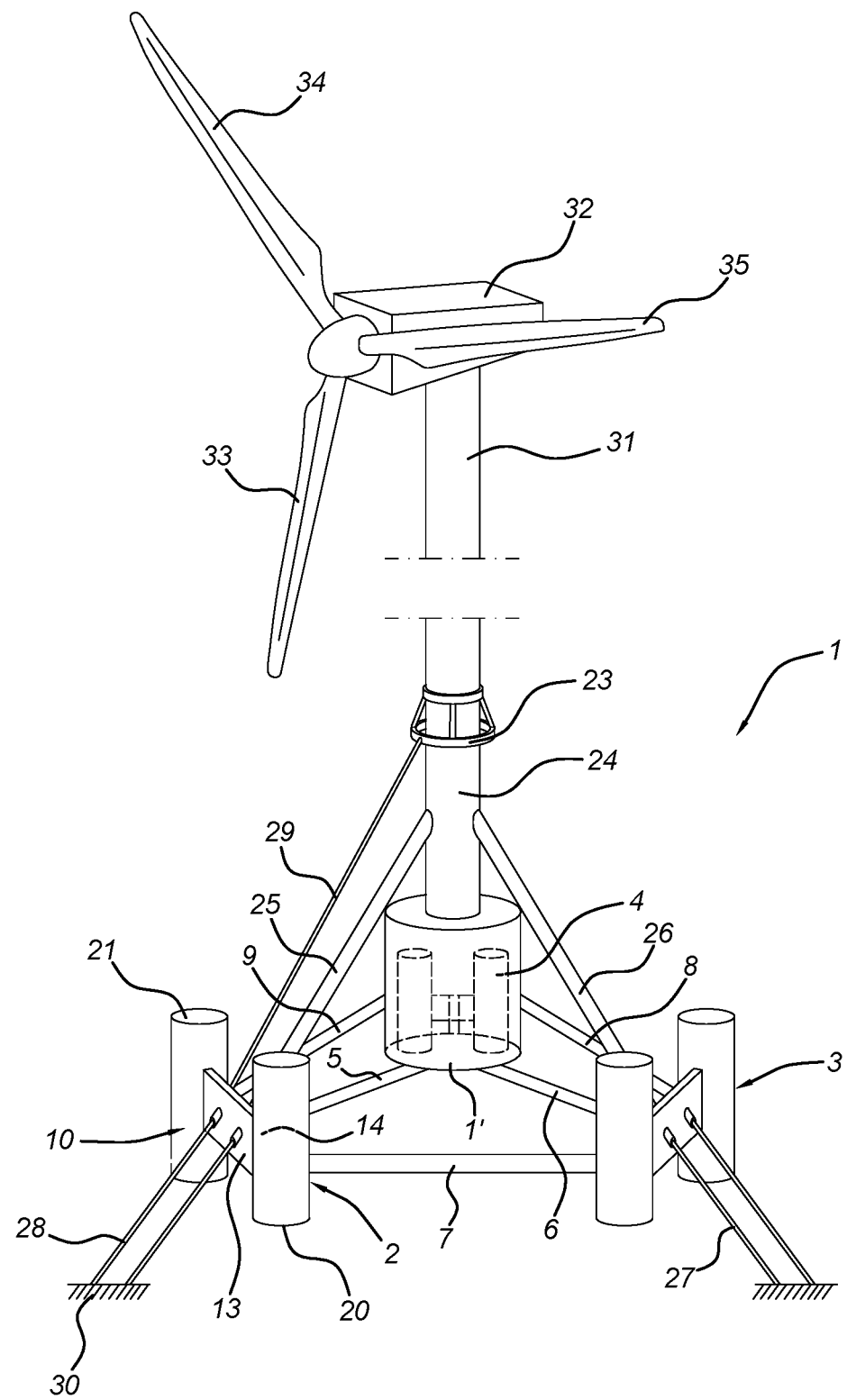
FIG. 1 shows a floating wind turbine comprising a support according to the invention.

FIG. 1 shows a tetrahedral shaped floating support 1 for a wind turbine, the support 1 comprising a central cylindrical body 1' and three buoyancy assemblies 2,3,4 connected to the central body 1' via radial connector beams 5,6 extending outwardly from the central body 1'. Transverse connector beams 7,8,9 extend circumferentially between adjacent buoyancy assemblies 2-4, that form corner points of the base plane of the support 1.

The cylindrical body 1' carries a vertical mast 24 with a tensioning member 23 for tensioning the mooring lines 27,28 with which the support 1 is fixed to the sea bed 30. The mast 24 may be of an open, tubular truss frame construction. From a position on the mast 24 above the buoyancy assemblies 2-4, angled radial connecting beams 25, 26 extend downward to the buoyancy assemblies. On the mast 24, the column 31 of the wind turbine is placed carrying a nacelle 32 and blades 33, 34,35.

Figure 2:
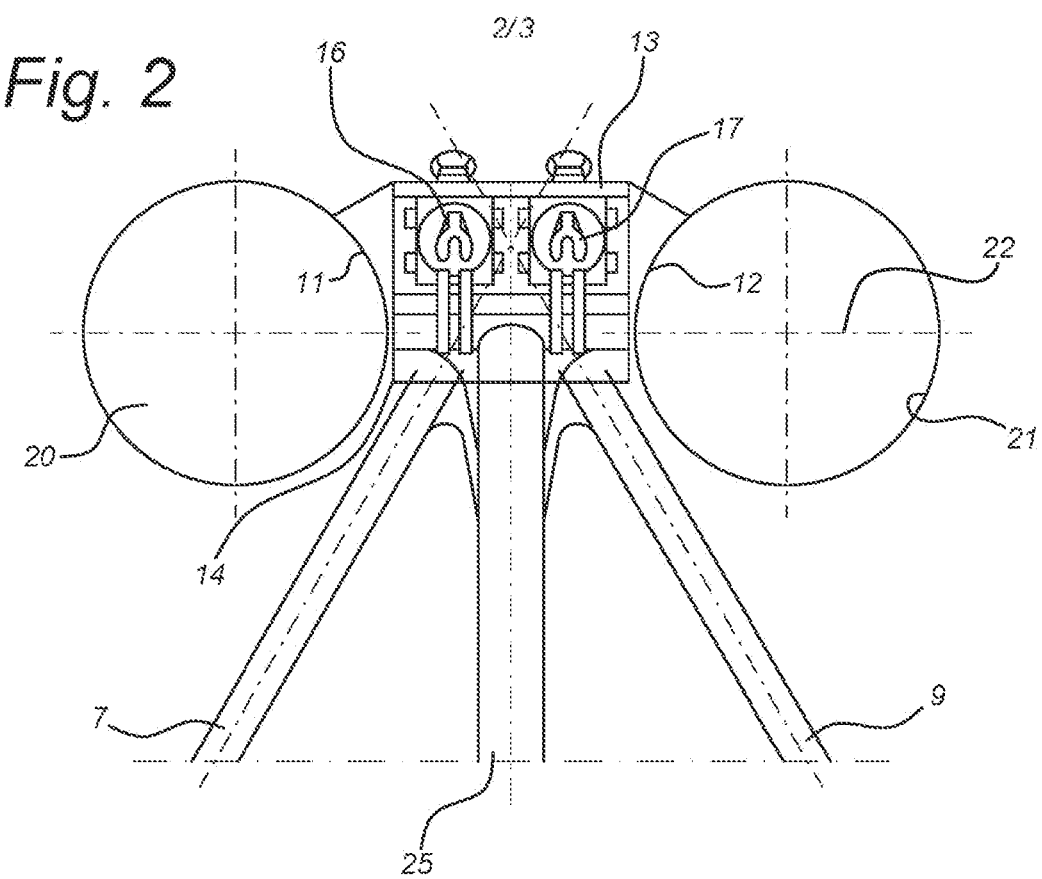
FIG. 2 shows an enlarged detail of the connector body and buoyancy members according to the invention in plan view.
Figure 3:
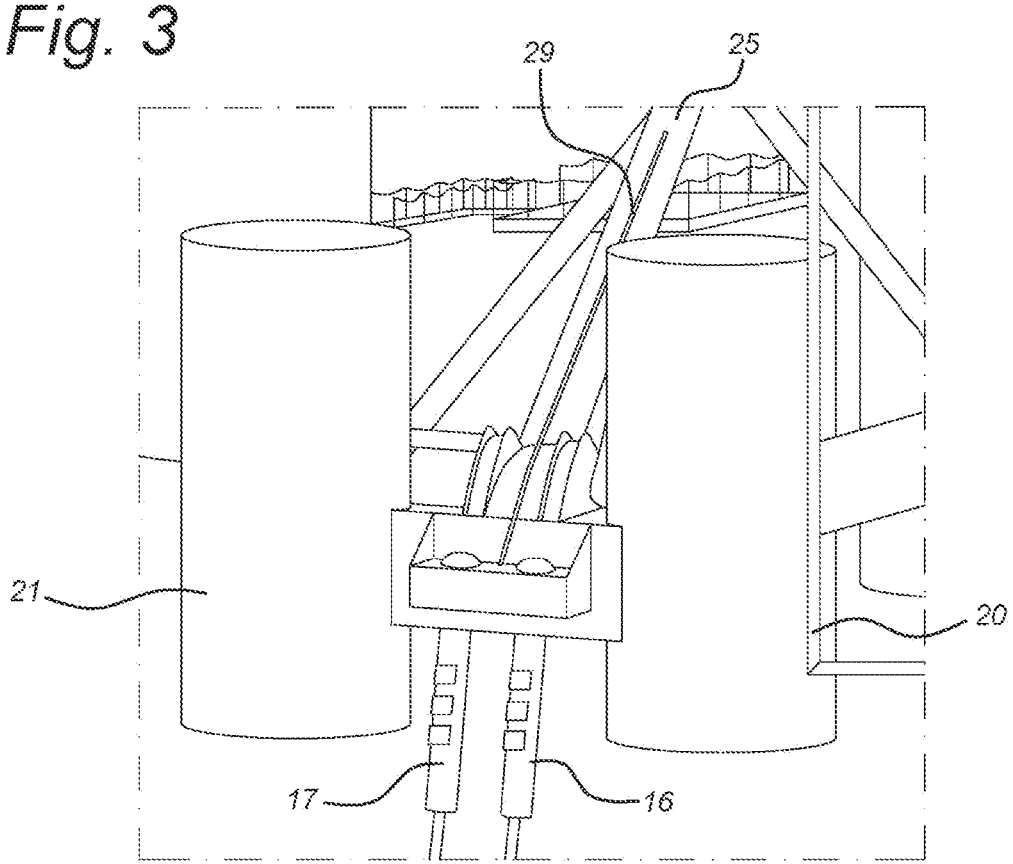
FIG. 3 shows a perspective view of the buoyancy assembly according to the invention.

As shown in FIG. 2 and FIG. 3, each buoyancy assembly 2,3,4 comprises two cylindrical buoys 20, 21, that are attached to opposed radial sides 11,12 of a respective connector body 10. The connector bodies 10 are along their inward transverse sides 14 attached to the radial, transverse and angled connector beams 5,6;7,8,9 and 25,26. At the outward transverse sides 13 of the connector bodies 10, anchor line connector members, such as pivoting chain connectors 16,17 having chain stopper members, connect to upper parts of the mooring lines 27,28. The mooring lines 27,28 may be formed of catenary chains, synthetic anchor lines or combinations of synthetic anchor lines and chain sections. A line 22 passing through central axes of the cylindrical buoys 20, 21 is situated closer to the central support member 1' than the pivoting chain connectors 16, 17.

At the deployment site, the mooring lines 27,28 are tensioned by connecting their upper parts via a tensioning line 29 to the tensioning device 23, which may be a jack or winch or any other suitable tensioning device, and pulling in the mooring lines along a substantially straight line tensioning path. When the buoyancy assemblies and the central body 1' are submerged to the desired depth, such as for instance 30 m, the tensioning device 23 is disconnected from the upper parts of the mooring lines. The buoys 20,21 and the central support member 1'may be ballastable by allowing entry of water into the hollow bodies of the buoys and the support member.

The floating support 1 may be towed to the deployment site in a Y-configuration, with the leg of the Y in the towing direction, by attaching towing line sections to two adjacent buoyancy assemblies via auxiliary brackets and connecting the connection point of the towing line sections to a main towing line.

Alternatively, the main towing line may be attached to the connector body 10 of one of the buoyancy assemblies 2,3,4 without the need for an auxiliary attachment aid, for towing to the deployment site while avoiding towing loads on the cylindrical buoys 20,21.

The height of the buoys 20, 21 may be between 8 m and 20 m, preferably about 15 m at a diameter between 4 m and 14 m, preferably about 6 m.

The length of the radial connector beams 5,6 is between 25 m and 50 m and the length of the transverse connector beams 7 is between 40 m and 90 m, preferably about 65 m.

The height of the central support member 1' is between 5 m and 20 m, at a diameter of between 4 m and 15 m.

The height of the vertical section 24 can be 20 m to 50 m above the top of central support 1' and the tensioning member may be placed at a height of about 30 m above the top of central support 1' preferably just above the angled interconnecting beams 25,26.

The column 31 of the wind turbine can be 80 m or taller, and the length of the blades 34,35,36 can be 60 m or longer, for instance 85 m to 110 m.

Figure 4:
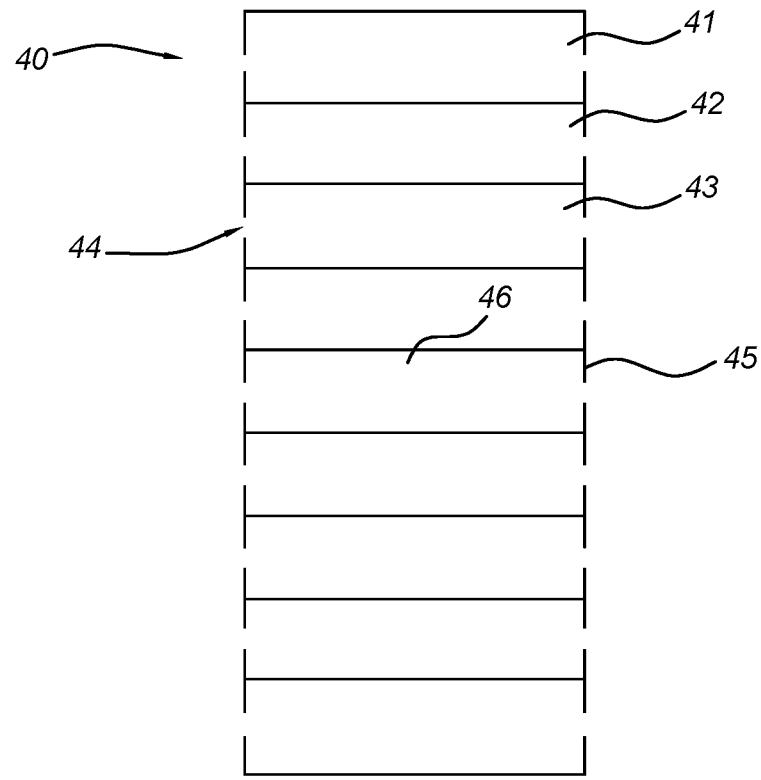
FIG. 4 shows a schematic view of a buoy 40 made up of a stack of annular segments.

FIG. 4 schematically shows a stack 40 or annular segments 41,42,43 that are interconnected by welding along circumferential welds 44. Each annular segment 41-43 consists of an annular side plate 45 and an internal reinforcement member 46.

Figure 5:
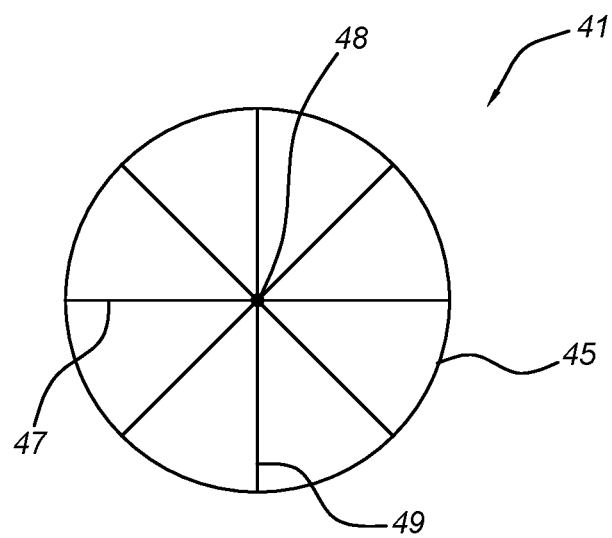
FIG. 5 shows a plan view of a segment shown in FIG. 4.

FIG. 5 shows a plan view of a segment 41, with a number of reinforcement brackets 47,48 connected to a central hub 48. At least a number of segments 41-43 is reinforced in this manner.

By using the connector bodies 10 according to the invention, the buoys 20, 21 can be of a relatively simple construction and can be made of segments in a relatively simple manner, at high speed to provide a production rate that is commensurate with the installation of large scale offshore wind farms.

The invention claimed is:

1. Floating support for a wind turbine comprising a central support member, and at least three buoyancy assemblies, each connected to the central support member via a radial connector beam and mutually interconnected via a transverse connector beam, wherein each buoyancy assembly comprises two buoyancy elements, a connector body having two radial sides, an outward and an inward transverse side, wherein two transverse connector beams and a radial connector beam extend away from the inward transverse side of the connector body, pivoting chain connectors are provided at or near the outward transverse side of the connector body and the radial sides of the connector body are each connected to a respective buoyancy element, wherein a line passing through central axes of the two buoyancy elements of a respective buoyancy assembly is situated closer to the central support member than the pivoting chain connectors.

2. The floating support according to claim 1, wherein the connector bodies carry at or near their outward transverse side at least one pivoting chain connector.

3. The floating support according to claim 2, comprising a chain tensioning device attached to the central support member, a substantially straight line chain tensioning path extending from the chain connector, between the buoyancy elements to the tensioning device.

4. The floating support according to claim 1, wherein the central support member comprises a vertical section, an angled radial interconnecting beam extending from a pre-determined height along the vertical section above the connector body, to each connector body.

5. The floating support according to claim 1, wherein the buoyancy elements are of cylindrical shape comprising a stack of reinforced cylindrical segments interconnected by circumferential welding.

6. The floating support of claim 2, comprising at least two of the pivoting chain connectors.

7. The floating support according to claim 2, wherein the central support member comprises a vertical section, an angled radial interconnecting beam extending from a predetermined height along the vertical section above the connector body, to each connector body.

8. The floating support according to claim 3, wherein the central support member comprises a vertical section, an angled radial interconnecting beam extending from a predetermined height along the vertical section above the connector body, to each connector body.

9. The floating support according to claim 2, wherein the buoyancy elements are of cylindrical shape comprising a stack of reinforced cylindrical segments interconnected by circumferential welding.

10. The floating support according to claim 3, wherein the buoyancy elements are of cylindrical shape comprising a stack of reinforced cylindrical segments interconnected by circumferential welding.

11. The floating support according to claim 4, wherein the buoyancy elements are of cylindrical shape comprising a stack of reinforced cylindrical segments interconnected by circumferential welding.

12. The floating support according to claim 7, wherein the buoyancy elements are of cylindrical shape comprising a stack of reinforced cylindrical segments interconnected by circumferential welding.

13. The floating support according to claim 8, wherein the buoyancy elements are of cylindrical shape comprising a stack of reinforced cylindrical segments interconnected by circumferential welding.

14. The floating support according to claim 6, comprising a chain tensioning device attached to the central support member, a substantially straight line chain tensioning path extending from the chain connector, between the buoyancy elements to the tensioning device.

* * * * *